United States Patent
Park et al.

(10) Patent No.: US 10,924,782 B2
(45) Date of Patent: Feb. 16, 2021

(54) METHOD OF PROVIDING STREAMING SERVICE BASED ON IMAGE SEGMENTATION AND ELECTRONIC DEVICE SUPPORTING THE SAME

(71) Applicant: KOREA ELECTRONICS TECHNOLOGY INSTITUTE, Seongnam-si (KR)

(72) Inventors: Woochool Park, Incheon (KR); Junhwan Jang, Goyang-si (KR); Youngwha Kim, Seoul (KR); Jinwook Yang, Goyang-si (KR); Sangpil Yoon, Seoul (KR); Hyunwook Kim, Goyang-si (KR); Eunkyung Cho, Gyeonggi-do (KR); Minsu Choi, Seoul (KR); Junsuk Lee, Seoul (KR); Jaeyoung Yang, Seoul (KR)

(73) Assignee: Korea Electronics Technology Institute, Gyeonggi-do (KR)

( * ) Notice: Subject to any disclaimer, the term of this patent is extended or adjusted under 35 U.S.C. 154(b) by 0 days.

(21) Appl. No.: 16/204,972

(22) Filed: Nov. 29, 2018

(65) Prior Publication Data

US 2019/0166391 A1    May 30, 2019

(30) Foreign Application Priority Data

Nov. 29, 2017    (KR) .................. 10-2017-0161381

(51) Int. Cl.
*H04N 21/2343* (2011.01)
*H04N 21/234* (2011.01)
*H04N 21/442* (2011.01)

(52) U.S. Cl.
CPC ............. *H04N 21/234345* (2013.01); *H04N 21/234372* (2013.01)

(58) Field of Classification Search
CPC ....... H04N 21/2343; H04N 21/234345; H04N 21/23412; H04N 21/44012; H04N 21/437; H04N 21/4348
See application file for complete search history.

(56) References Cited

U.S. PATENT DOCUMENTS

| | | | |
|---|---|---|---|
| 2014/0089990 A1* | 3/2014 | van Deventer | .... H04N 21/2356 725/61 |
| 2015/0304665 A1* | 10/2015 | Hannuksela | ........... H04N 19/70 375/240.02 |

(Continued)

FOREIGN PATENT DOCUMENTS

| KR | 10-2010-0002632 A | 1/2010 |
|---|---|---|
| KR | 10-2015-0016613 A | 2/2015 |
| KR | 10-1764317 B1 | 8/2017 |

OTHER PUBLICATIONS

Office Action of corresponding Korean Patent Application No. 10-2017-0161381—5 pages (dated May 13, 2019).

*Primary Examiner* — Hsiungfei Peng
*Assistant Examiner* — Fred Peng
(74) *Attorney, Agent, or Firm* — Knobbe Martens Olson & Bear LLP

(57) ABSTRACT

The present disclosure provides a system for providing an image-segmentation based streaming service. The system includes a communication circuit configured to establish a communication channel with a streaming server, a storage configured to store data provided by the streaming server, a display configured to output an image, a processor functionally connected to the communication circuit, the storage, and the display. The processor can detect a region-of-interest (ROI) of an output image associated with a media presentation description (MPD) provided by the streaming server and transmit the ROI information to the streaming server. The processor can also receive image segments of a first (Continued)

resolution corresponding to the ROI information and a full image of a second resolution from the streaming server. The processor can also synthesize the image segments of the first resolution and the full image of the second resolution to output a synthesized reconstruction image through the display.

7 Claims, 5 Drawing Sheets

(56) References Cited

U.S. PATENT DOCUMENTS

2019/0098347 A1* 3/2019 Chaugule ............ H04N 21/2187
2019/0238861 A1* 8/2019 D'Acunto ......... H04N 21/21805
2019/0238933 A1* 8/2019 Di ........................ H04N 21/236

* cited by examiner

METHOD OF PROVIDING STREAMING SERVICE BASED ON IMAGE SEGMENTATION AND ELECTRONIC DEVICE SUPPORTING THE SAME

CROSS-REFERENCE TO RELATED APPLICATION

The present application claims priority to Korean Patent Application No. 10-2017-0161381 filed on Nov. 29, 2017, in the Korean Intellectual Property Office, which is incorporated herein in its entirety by reference.

TECHNICAL FIELD

The present disclosure relates to a method and apparatus for providing a streaming service.

BACKGROUND

The development of Internet enabled the transmission of large-sized media files for high-quality video contents. However, the Internet still has limited bandwidth, and the quality of service (QoS) of the Internet is not sufficient for seamless streaming of the large-sized media contents to consumers.

In order to solve this problem, it was needed to develop a streaming technology which may facilitate the streaming of the media contents adaptively to a network environment, and the Moving Picture Experts Group (MPEG), an international standardization organization, established a standard named Dynamic Adaptive Streaming over HTTP (DASH).

The MPEG-DASH is a standard for seamlessly delivering media contents to users adaptively to user environments including a condition of a network and a performance of a user terminal. The standard covered by the MPEG-DASH includes media presentation description (MPD) scheme for describing information related to a generation and consumption of the media contents, a media segmentation technology related to a time-based content segmentation, an access location technology for downloading or streaming each time-division media segment file, a file formatting technology that supports the MPEG-DASH, and a profiling technology for changing the configuration of the MPD according to the formats of the digital media contents being consumed or stored.

PRIOR ART DOCUMENT

Patent Literature

Korean patent No. 10-1764317 issued on Jul. 27, 2017

SUMMARY

However, even the MPEG-DASH may be insufficient for supporting the seamless streaming of the high resolution video contents.

According to the present disclosure, provided are a method of providing a streaming service based on image segmentation to transmit contents with little interruption or seamlessly, and an electronic device suitable for supporting the method.

According to an aspect of an exemplary embodiment, a method of providing a streaming service based on image segmentation is performed by an electronic device that is capable of accessing a streaming server. The method includes: requesting a media presentation description (MPD) file from a streaming server; parsing and caching data in the MPD file; detecting region-of-interest (ROI) in an image associated with cached data; transmitting the ROI to the streaming server; receiving image segments corresponding to the ROI, a full image and audio information of a same time as the image segments, and demultiplexing the full image and the audio information, outputting the image segments and the full image on a display device, and outputting sound corresponding to the audio information through an input/output device.

According to an aspect of another exemplary embodiment, an electronic device includes: a communication circuit configured to establish a communication channel with a streaming server; a storage configured to store data provided by the streaming server; a display configured to output an image; a processing unit functionally connected to the communication circuit, the storage, and the display. The processing unit detects a region-of-interest (ROI) of an output image associated with a media presentation description (MPD) provided by the streaming server, transmit the ROI information to the streaming server, receive image segments of a first resolution corresponding to the ROI information and a full image of a second resolution from the streaming server, and synthesizing the image segments of the first resolution and the full image of the second resolution to output a synthesized reconstruction image through the display.

The electronic device may further include a sensor configured to acquire sensing information related to a direction of the electronic device. The processing unit may detect, based on the sensing information, a screen portion of the display corresponding the direction of the electronic device as the ROI.

The processing unit may separate a main object and a background object in the image based on information obtained by parsing the MPD and determine the region of the image in which the main object is located as the ROI.

The electronic device may further include an input/output device. The processing unit may receive the full image of the second resolution and audio information mixed with the full image, separate the audio information from the full image of the second resolution, and output sound corresponding to the audio information through the input/output device.

The processing unit may generate a background image by enlarging the full image of the second resolution into a size fitting a screen size of the display, and synthesize the background image with the image segments of the first resolution to output through the display.

According to the method of providing the streaming service based on image segmentation according to the present disclosure and the electronic device suitable for the same enables the streaming service user to watch the high resolution video contents without buffering or interruption in playback.

BRIEF DESCRIPTION OF THE DRAWINGS

In order that the disclosure may be well understood, there will now be described various forms thereof, given by way of example, reference being made to the accompanying drawings, in which.

Figure 1:
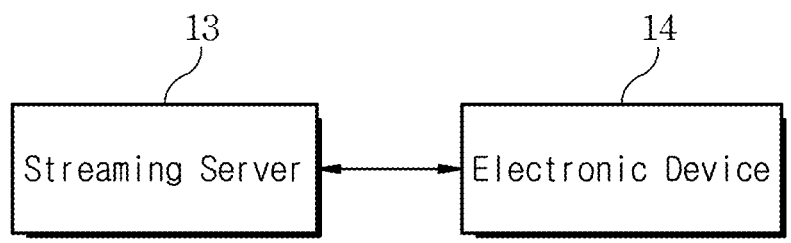
FIG. 1 is a block diagram of a system for providing a streaming service based on image segmentation according to an embodiment of the present disclosure.

The drawings described herein are for illustration purposes only and are not intended to limit the scope of the present disclosure in any way.

DETAILED DESCRIPTION

Hereinafter, exemplary embodiments of the present disclosure will be described in detail with reference to the accompanied drawings. The scope of present disclosure the disclosure should not limited by the exemplary embodiments, but be interpreted to cover a variety of modifications, equivalents, and/or alternatives of the exemplary embodiments. In the drawings, the same reference numerals are used to designate the same or similar elements throughout the drawings.

FIG. 1 is a block diagram of a system for providing a streaming service based on image segmentation according to an embodiment of the present disclosure.

Referring to FIG. 1, the image segmentation-based streaming service providing system 10 according to an embodiment may include a streaming server 13 and an electronic device 14 such as a portable terminal device, an head mount display (HMD) device, and another client device. The image segmentation-based streaming service providing system 10 may further include a transcoder suitable for providing segmented images to the streaming server 13 rather than existing outside the streaming server 13.

The transcoder may divide an image or a media content into a plurality of regions of the same resolution, into a plurality of regions of different resolutions, or by a predetermined interval of playback time of the media content according to a prescribed policy or rule. The transcoder may provide the streaming server 13 with segmented media content files (e.g., tile-encoded files encoded according to a high efficiency video encoding (HEVC) standard). In another embodiment, the transcoder may be included in the streaming server 13.

The transcoder may perform a HEVC tiled-based encoding or a HEVC encoding for the segmented media content file such as a 360-degree virtual reality (VR) video content or a live broadcast video content to provide the encoded content file to the streaming server 13. The transcoder may create metadata for the tile-based encoded media content file (MetaInfo) and provide the metadata to the streaming server 13 along with the tile-based encoded media content file when the tile-based encoded media content file is transmitted to the streaming server 13. The transcoder can perform the HEVC tile based-encoding of the high quality media content in real-time or at a designated time. In this operation, the transcoder may divide one image into a predetermined size or space of image segments and perform the HEVC tiled-encoding for the image segments sequentially. The encoded image segments provided by the transcoder to the streaming server 13 may include at least one of: a HEVC tile-based encoded high quality (HQ) image segment of 8K resolution or above, a HEVC tile-based encoded medium quality (MQ) image segment of 2K or 4K resolution or above, and a HEVC encoded full medium (FullMQ) image segment of 2K or 4K resolution. The metadata may include information of tiles, bit rates, frame rates (frames per second: FPS), bandwidth for the encoded image segments.

The streaming server 13 may generate media presentation description (MPD) files for the image segments to transmits the MPD files to the electronic device 14. Also, the streaming server 13 requests and receives region-of-interest (ROI) information from the electronic device 14, and transmits the image segments having different resolutions to the electronic device 14 based on received ROI information. The MPD file is a manifest file that contains information of a corresponding image segment such as media content availability, alternative bit rates, and a universal resource locator (URL).

The streaming server 13 may store and maintain image segments of different resolutions. Alternatively, the streaming server 130 may receive the image segments of different resolutions from the transcoder in real-time. The streaming server 13 may provide the electronic device 14 with the image segments of different resolutions in response to a request of the electronic device 14.

The electronic device 14 may acquire information such as program timing, the media content availability, media types, resolutions, minimum and maximum bandwidths, existence of various encoding alternatives, and DRM-related information by parsing the MPD file. The electronic device 14 can select an appropriate encoding alternative suitable for the condition of the network or the electronic device 14 and perform streaming of the media contents by fetching the segments using HTTP GET requests. For example, the electronic device 14 may establish a communication channel with the streaming server 13 according to a user input. The electronic device 14 may receive another image segment having a resolution different from that of a previously received segment from the streaming server 13 according to the user input or a schedule determined in advance. The electronic device 14 may combine the received image segments of different resolutions to reconstruct an image and output the reconstructed image through an output device such as a display.

In this operation, the electronic device 14 may acquire the ROI information for the image and transmit the obtained ROI information to the streaming server 13. The electronic device 14 may receive the an image segment of a higher resolution for the ROI from the streaming server 13 and use the image segment of the higher resolution for the ROI in combining the received image segments.

As described above, the image segmentation-based streaming service providing system according to the present disclosure may reconstruct an image having a higher resolution in the region-of-interest in which the user is interested or concentrated or is to be concentrated while maintaining a relatively low resolution for surrounding regions. Accordingly, it is possible to reduce the bandwidth required for the transmission of the media content and minimize the buffering that may happen in the transmission and outputting of the media content while allowing the user of the electronic device 14 to watch the high quality image for the region-of-interest.

Figure 2:
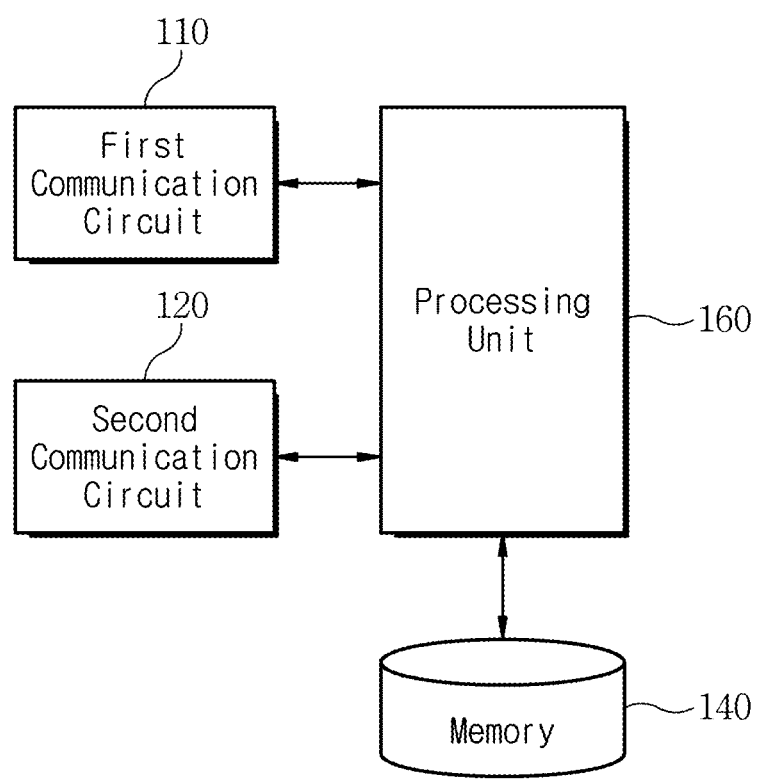
FIG. 2 is a block diagram of a streaming server shown in FIG. 1 according to an embodiment of the present disclosure.

FIG. 2 is a block diagram of the streaming server 13 according to an embodiment of the present disclosure.

Referring to FIG. 2, the streaming server 13 according to an embodiment of the present disclosure includes a first communication circuit 110, a second communication circuit 120, a memory 140, and a processing unit 160 such as a controller, at least one processor, and a processing module.

The first communication circuit 110 may establish a communication channel for communicating with the transcoder to receive the image segments of different resolutions. The first communication circuit 110 may include at least one of a wired communication interface or a wireless communication interface. The first communication circuit 110 may receive the metadata for the image segment files of various qualities from the transcoder in addition to the image segment files.

The second communication circuit 120 may establish a communication channel with the electronic device 14. The second communication circuit 120 may include at least one of a wired communication interface or a wireless communication interface. The second communication circuit 120 may allocate a channel to the electronic device 14 accessing the streaming server 13 and receive a media request signal from the electronic device 14. The second communication circuit 120 may provide the electronic device 14 with the image segments corresponding to the media request signal and the MPD files associated with the image segments.

The memory 140 may store various programs or various instructions necessary for an operation of the streaming server 13. For example, the memory 140 may store at least one instruction configured to receive the image segments of different resolutions through the first communication circuit 110, at least one instruction configured to generate the MPD file for the received image segment, at least one instruction configured to perform a DASHing operation for the received image segment, and instructions configured to receive the media request from the electronic device 14 and to provide the image segment and the MPD file to the electronic device 14 in response to the received media request. In addition, the memory 140 may store instructions configured to receive the ROI information from the electronic device 14 and instructions configured to select the image segment of different resolutions based on the ROI information to transmit to the electronic device 14.

The processing unit 160 may perform the execution of the instructions related with the operation of the streaming server 13, and store and maintain data such as the image segments. The processing unit 160 may be implemented by at least one processor, or may be implemented by at least one software module executed by a predetermined processor.

For example, the processing unit 160 may allocate a buffer to receive the image segments from an external device such as the transcoder. The processing unit 160 may allocate a first buffer for storing the image segments of a first resolution and a second buffer for storing the image or image segments of a second resolution different from the first resolution. For example the second resolution may be lower than the first resolution. The processing unit 160 may generate the MPD files for the image segments stored in the first buffer and the second buffer and provide the generated MPD files to the electronic device 14.

The processing unit 160 may send a message to the electronic device 14 requesting the ROI information. After receiving the ROI information from the electronic device 14, the processing unit 160 may determine which image segment should be transmitted in higher resolutions by checking the ROI information. The processing unit 160 may request and receive at least one image segment of the higher resolution that correspond to the ROI from an external device, e.g. the transcoder. In another embodiment where the streaming server 13 stores and maintains the image segment files of various resolutions for any of the image segments, the streaming server 13 may read out the higher resolution image segments for the ROI among the image segments stored in the memory 140 to transmit the higher resolution image segments to the electronic device 14. Here, the processing unit 160 of the streaming server 13 may transmit the full image of the lower resolution to the electronic device 14 along with the higher resolution image for the ROI. Alternatively, the processing unit 160 of the streaming server 13 may transmit full image of the lower resolution along with audio information to the electronic device 14 over a first channel while transmitting the higher resolution image segments corresponding to the ROI to the electronic device 14 over a second channel.

Figure 3:
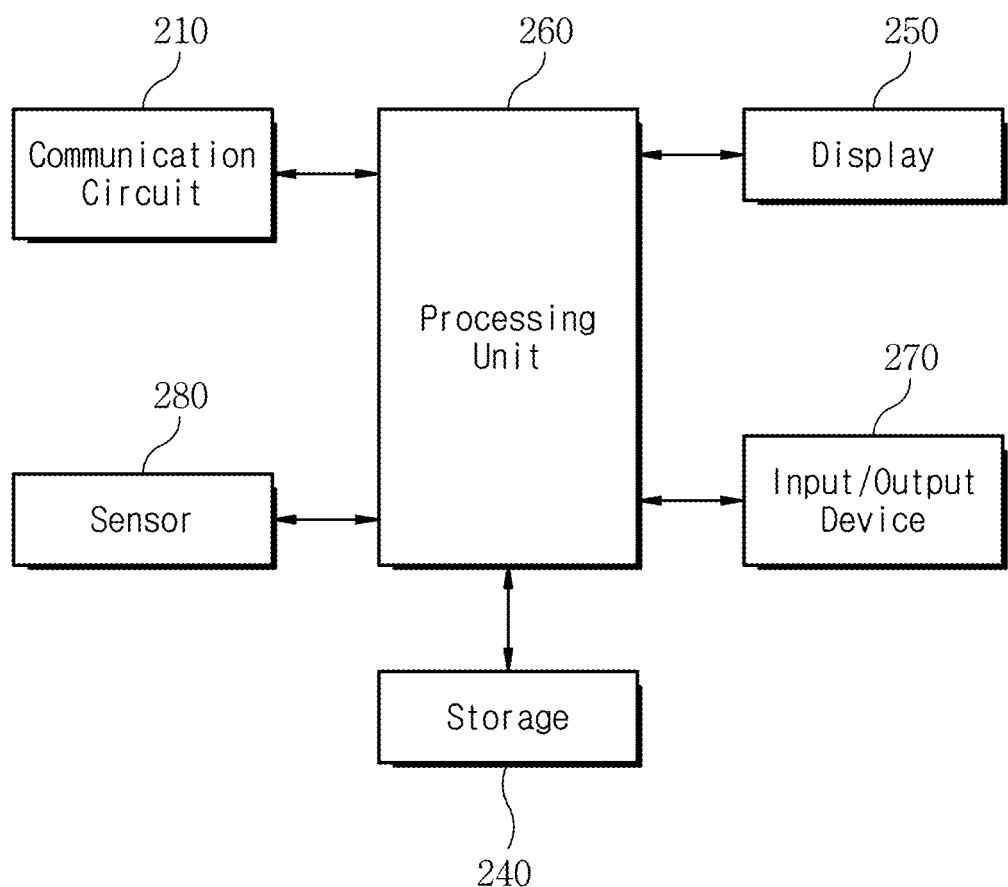
FIG. 3 is a block diagram of an electronic device shown in FIG. 1 according to an embodiment of the present disclosure.

FIG. 3 is a block diagram of the electronic device 14 according to an embodiment of the present disclosure.

Referring to FIG. 3, the electronic device 14 according to an embodiment of the present disclosure may include a communication circuit 210, a storage 240, a display 250, an input/output device 270, a sensor 280, and a processing unit 260.

The communication circuit 210 may establish a communication channel with the streaming server 13. For example, the communication circuit 210 may receive the MPD files or the image segments (e.g., the image segments of the first resolution and the image or image segments of the second resolution) from the streaming server 13. Also, the communication circuit 210 may transmit the ROI information collected by the processing unit 260 to the streaming server 13.

The storage 240 may store programs and instructions necessary for an operation of the electronic device 14. For example, in case that the electronic device 14 is a head mount display (HMD) device, the storage 240 may store an application program related to an operation of the HMD device. The storage 240 may temporarily or semi-permanently store the MPD files and the image segments received from the streaming server 13. Also, the storage 240 may store the entire output image generated by combining the image segments based on the ROI to provide the processing unit 260 with the entire output image in response to a control of the processing unit 260.

The display 250 can output a screen image associated with the operation of the electronic device 14. For example, the display 250 can output a screen image associated with an access to the streaming server 13, a screen image associated with the MPD files provided by the streaming server 13, and the entire output image generated by combining the image segments based on the ROI. The display 250 may include separate display areas that are included in the HMD device, for example, and can output the virtual reality images. Further, a left eye image and a right eye image may be output to respective ones of the separate display areas.

The input/output device 270 receives user input related to the operation of the electronic device 14 and may include at least one device among at least one button, a touchpad, a touch screen, and a microphone for voice input. The input/output device 270 may include an audio device capable of outputting an audio signal related to the operation of the electronic device 14, or a lamp or a vibrating device capable of outputting a state of the electronic device 14. In particular, the input/output device 270 may output the audio signal received from the streaming server 13 in synchronicity with the image segments.

The sensor 280 may collect various sensing information related to a motion, a direction, and a movement of the electronic device 14. The sensor 280 may transfer the collected sensing information to the processing unit 260.

The processing unit 260 is responsible for the processing of the instructions or the data transfer associated with the operation of the electronic device 14. For example, the processing unit 260 may establish a communication channel with the streaming server 13 in response to the user input received through the input/output device 270 and receive the MPD files from the streaming server 13. The processing unit 260 may request a media content from the streaming server 13 according to the user input, receive the image segments from the streaming server 13, and output the image reconstructed using the image segments through the display 250. At this time, the processing unit 260 may collect sensing information through the sensor 280 and detect, by using the collected sensing information, a direction that the electronic device 14 is facing or a direction that the screen is being viewed in the display 250. The processing unit 260 may collect the ROI information based on the direction information in the display 250 and provide the ROI information to the streaming server 13. For example, in case that the electronic device 14 is the HMD device, the ROI information may be acquired based on the sensing information from the sensor 280. In detail, the ROI information may be acquired from a direction of a viewport which indicates a direction toward which a head of the user and the HMD device is directed.

As another example, the processing unit 260 may separate the main object from background objects by analyzing the output image. The processing unit 260 may determine the region of the image in which the main object is located as the ROI and transmit the ROI information to the streaming server 13. Alternatively, the processing unit 260 may collect the ROI information designated by user input on the display 250 and transmit the ROI information to the streaming server 13.

The processing unit 260 may generate the ROI-based output image by combining the image segments containing background objects of relatively low resolution and image segments of the main object having relatively high resolution to output through the display 250.

The background image of low resolution does not occupy large bandwidth and can be output seamlessly through the display 250. Accordingly, the electronic device 14 can provide the output image of which quality is high in the ROI while streaming the media content without buffering or interruption in playback. Further, the electronic device 14 may receive audio information along with the low resolution background segments to output audio sound through the input/output device 270.

Figure 4:
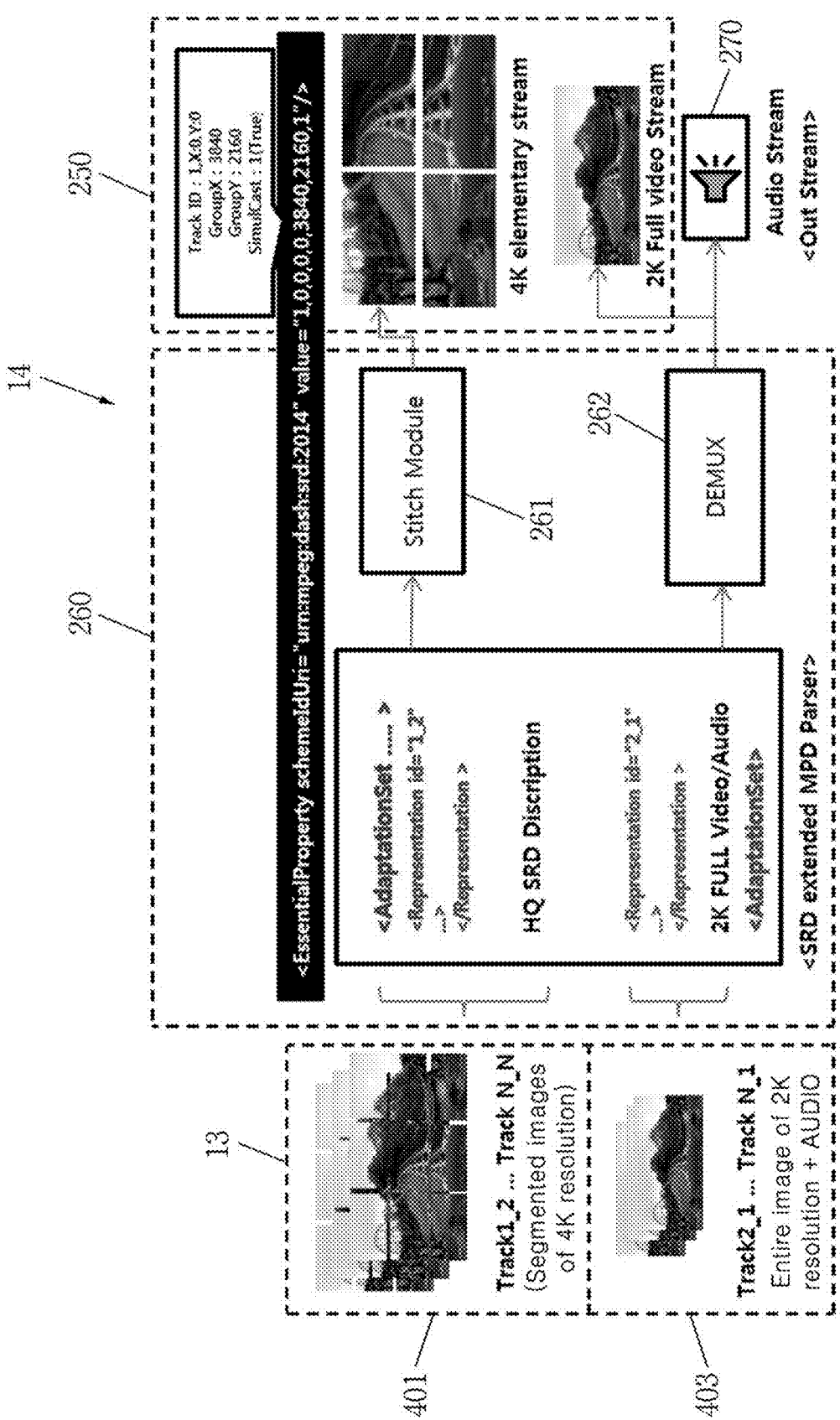
FIG. 4 illustrates an example of an image segmentation-based streaming service according to an embodiment of the present disclosure.

FIG. 4 illustrates an example of the image segmentation-based streaming service according to an embodiment of the present disclosure.

Referring to FIG. 4, the streaming server 13 may maintain segmented images of the first resolution (e.g. high quality images of 4K resolution), the full image of the second resolution that is lower than the first resolution (e.g. the full medium quality image of 2K resolution), and the audio information in the memory 140.

Upon receiving the ROI information from the electronic device 14, the streaming server 13 may transmit the image segments of the first resolution for the region corresponding to the ROI information and the full image of the second resolution for the background along with the audio information to the electronic device 14. The positions and spatial relationships of the image segments may be described in the MPD according to Spatial Representation Description (SRD) feature provided by the second amendment of the MPEG-DASH standard.

The processing unit 260 of the electronic device 14 may parse SRD of the extended MPD files received from the streaming server 13 and transfer the image segments of the first resolution to a stitch module 261 with reference to the SRD while transferring the full image of the second resolution and audio information to a demultiplexer 262. The stitch module 261 may stitch the image segments of the first resolution to reconstruct an image portion for the ROI and store the reconstructed ROI image in a buffer of the display 250. The demultiplexer 262 may separate the audio information from the full image of the second resolution and transfer the audio information to an output device such as a speaker of the input/output device 270. The full image of the second resolution can be stored in the buffer of the display 250.

The display 250 may overlay the reconstructed ROI image of the first resolution on the full image of the second resolution in the buffer or combine the reconstructed ROI image with the full image to output through the display 250.

Figure 5:
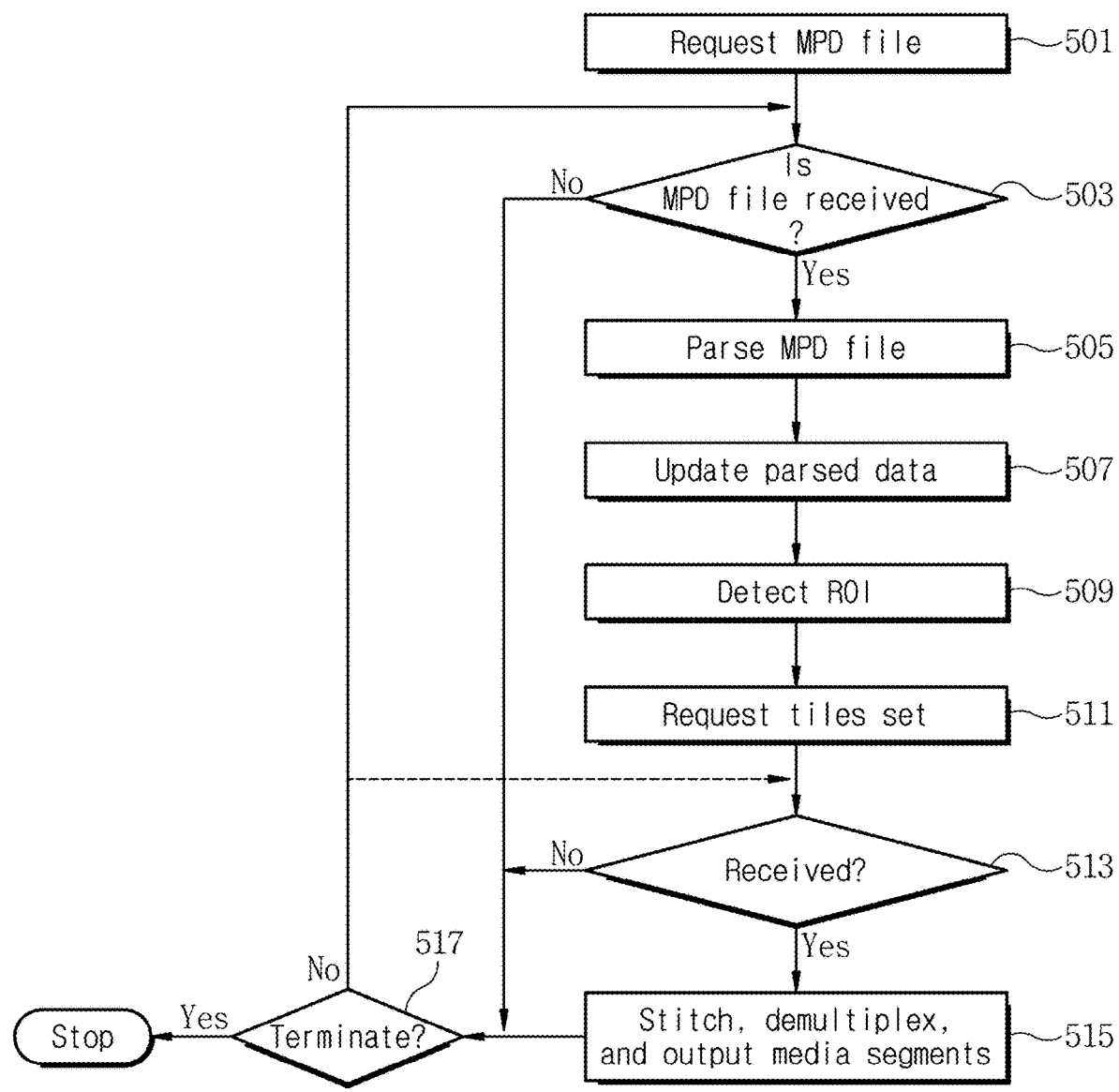
FIG. 5 is a flowchart showing an example of a method of operating the electronic device related with the image segmentation-based streaming service according to an embodiment of the present disclosure.

FIG. 5 is a flowchart showing an example of the method of operating the electronic device related with the image segmentation-based streaming service according to an embodiment of the present disclosure.

Referring to FIG. 5, the processing unit 260 of the electronic device 14 may request the MPD file from the streaming server 13 in operation 501. For example, the processing unit 260 may establish a communication channel with the streaming server 13 and request the MPD file from the streaming server 13 according to the user input or according to a schedule prepared in advance.

In operation 503, the processing unit 260 may check whether the MPD file is received. If the MPD file is not received, the processing unit 260 may check whether a termination event is occurred and stands by while waiting for the receipt of the MPD file if there is no termination event. When the MPD file is received, the processing unit 260 may parse the MPD file in operation 505. The data acquired by parsing the MPD file may be stored in a cache in operation 507 to update the parsed data previously stored in the cache. The processing unit 260 may detect the ROI in operation 509. For example, as mentioned above, the processing unit 260 may separate the main object from background objects in the image and determine the region of the main object as the ROI. Alternatively, the processing unit 260 may detect an image area designated by the viewport of the user as the ROI.

In operation 511, the processing unit 260 may request a set of tiles (e.g., image segments of the first resolution corresponding to the ROI) from the streaming server 13 based on the detected ROI. In case that the tiles set is stored in the memory 140 of the streaming server 13, the streaming server 13 can transmit the tiles set to the electronic device 14. Alternatively, the streaming server 13 may transfer the information of the image segments corresponding to the tiles set (e.g. positional information of the image segments in the full image) to the transcoder providing tile-encoded image segments and receive the tiles set from the transcoder to deliver to the electronic device 14. An example of the tiles set may include the image segments of the first resolution, the full image of the second resolution of a frame corresponding to the image segments, and the audio information for the frame.

In operation 513, the processing unit 260 checks whether the requested tiles set is received. If the requested tiles set is received, the processing unit 260 may stitch the image segments of the first resolution, demultiplex the full image of the second resolution and the audio information, and output the stitched image of the first resolution and the full image of the second resolution through the display 250 while outputting the audio sound through the input/output device 270.

In step 517, the processing unit 260 may check whether an event for effecting a termination of the streaming service occurs. For example, the processing unit 260 may recognize, as the termination event, a user input notifying an end of watching or a detection of the last image segment of the content. If there happens no termination event, the processing unit 260 may return the procedure to the operation 503 or 513 depending on the operation carried out just before.

Figure 6:
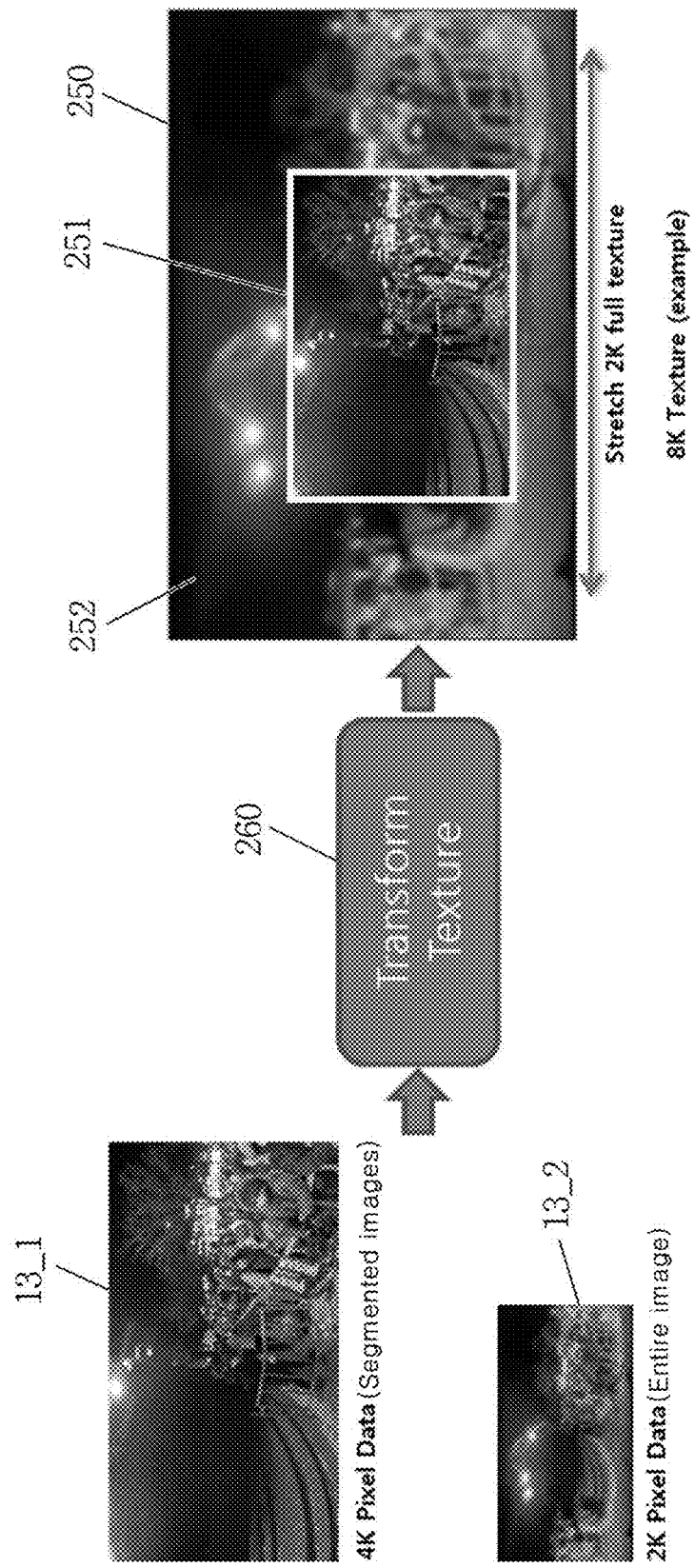
FIG. 6 illustrates an example of the image segmentation-based streaming service associated with a 360-degree virtual reality content according to an embodiment of the present disclosure.

FIG. 6 illustrates an example of the image segmentation-based streaming service associated with a 360-degree virtual reality content according to an embodiment of the present disclosure.

Referring to FIG. 6, the streaming server 13 may deliver a segmented image 13_1 having the first resolution (e.g. 4K resolution pixel data) and a full image 13_2 having the second resolution (e.g., 2K resolution pixel data) to the electronic device 14 in response to the request of the processing unit 260 of the electronic device 14.

The processing unit 260 may perform an image conversion operation for the received images. For example, the processing unit 260 may enlarge the full image of the second resolution into a size fitting the entire screen having a 8K texture or resolution, for example. The processing unit 260 may synthesize the segmented image 13_1 of the first resolution on the enlarged full image and output the synthesized full image through the display 250.

As a result, the display 250 can output an image having a background image portion 252 having the second resolution and a ROI image portion 251 having the first resolution. In the above description, the display 250 is assumed to have a size capable of outputting the 8K texture or resolution image. However, the size or aspect ratio of the display 25 and the scaling of the full image 13_2 having the second resolution may vary according to the configuration of the display 250.

Logical blocks, modules or units described in connection with embodiments disclosed herein can be implemented or performed by a computing device having at least one processor, at least one memory and at least one communication interface. The elements of a method, process, or algorithm described in connection with embodiments disclosed herein can be embodied directly in hardware, in a software module executed by at least one processor, or in a combination of the two. Computer-executable instructions for implementing a method, process, or algorithm described in connection with embodiments disclosed herein can be stored in a non-transitory computer readable storage medium.

The description of the disclosure is merely exemplary in nature and, thus, variations that do not depart from the substance of the disclosure are intended to be within the scope of the disclosure. Such variations are not to be regarded as a departure from the spirit and scope of the disclosure.

What is claimed is:

1. An electronic device, comprising:
   a communication circuit configured to establish a first communication channel and a second communication channel with a streaming server;
   a storage configured to store data provided by the streaming server;
   a display configured to display images using the data provided from the streaming server, wherein the display has a screen; and
   a processor functionally connected to the communication circuit, the storage, and the display,
   wherein the processor is configured to:
      detect a region-of-interest (ROI) based on a media presentation description (MPD) provided by the streaming server,
      transmit information of the detected ROI to the streaming server,
      receive, via the first communication channel, from the streaming server, a full image having a first resolution while receiving, via the second communication channel, at least one image segment corresponding to the detected ROI and having a second resolution higher than the first resolution,
      enlarge the full image to fit an entire portion of the screen of the display while maintaining the first resolution of the full image,
      synthesize the enlarged full image having the first resolution and the at least one image segment having the second resolution such that the at least one image segment is overlaid on the enlarged full image at an area of the detected ROI, and
      control the display to display the synthesized image, and
   wherein the display has a resolution being the same as a multiplication of the first resolution and the second resolution.

2. The electronic device of claim 1, further comprising:
   a sensor configured to acquire sensing information related to a direction of the electronic device,
   wherein the processor is further configured to detect, based on the sensing information, a screen portion of the display corresponding to the direction of the electronic device as the detected ROI.

3. The electronic device of claim 1, wherein the processor is further configured to identify a main object based on information obtained by parsing the MPD and to determine the detected ROI based on a location of the main object.

4. The electronic device of claim 1, further comprising:
   an input/output device,
   wherein the processor is further configured to:
      separate audio information from the full image, and
      output sound corresponding to the audio information through the input/output device.

5. The electronic device of claim 1, wherein the first resolution is 2K, wherein the second resolution is 4K, and wherein the resolution of the display is 8K.

6. A method of providing a streaming service based on image segmentation performed by an electronic device that is configured to access a streaming server, comprising:
   establishing a first communication channel and a second communication channel between the electronic device and the streaming server, the electronic device comprising a display configured to display images, the display having a screen;
   requesting a media presentation description (MPD) file from the streaming server;

parsing and caching data in the MPD file;

detecting a region-of-interest (ROI) using the cached data;

transmitting information of the detected ROI to the streaming server;

receiving, via the first communication channel, from the streaming server, a full image having a first resolution while receiving, via the second communication channel, at least one image segment corresponding to the detected ROI and having a second resolution higher than the first resolution;

enlarging the full image to fit an entire portion of the screen of the display while maintaining the first resolution of the full image;

synthesizing the enlarged full image having the first resolution and the at least one image segment having the second resolution such that the at least one image segment is overlaid on the enlarged full image at an area of the detected ROI; and controlling the display to display the synthesized image, wherein the display has a resolution being the same as a multiplication of the first resolution and the second resolution.

7. The method of claim 6, wherein the first resolution is 2K, wherein the second resolution is 4K, and wherein the resolution of the display is 8K.

\* \* \* \* \*